June 2, 1959

G. P. SHEEN 2,888,757

TRENCHING MACHINE

Filed July 15, 1957

GRAYDON P. SHEEN
*INVENTOR.*

BY Loyd J. Miller
ATTORNEY

June 2, 1959  G. P. SHEEN  2,888,757
TRENCHING MACHINE
Filed July 15, 1957  4 Sheets-Sheet 3

GRAYDON P. SHEEN
INVENTOR.

BY
ATTORNEY

June 2, 1959  G. P. SHEEN  2,888,757
TRENCHING MACHINE
Filed July 15, 1957  4 Sheets-Sheet 4
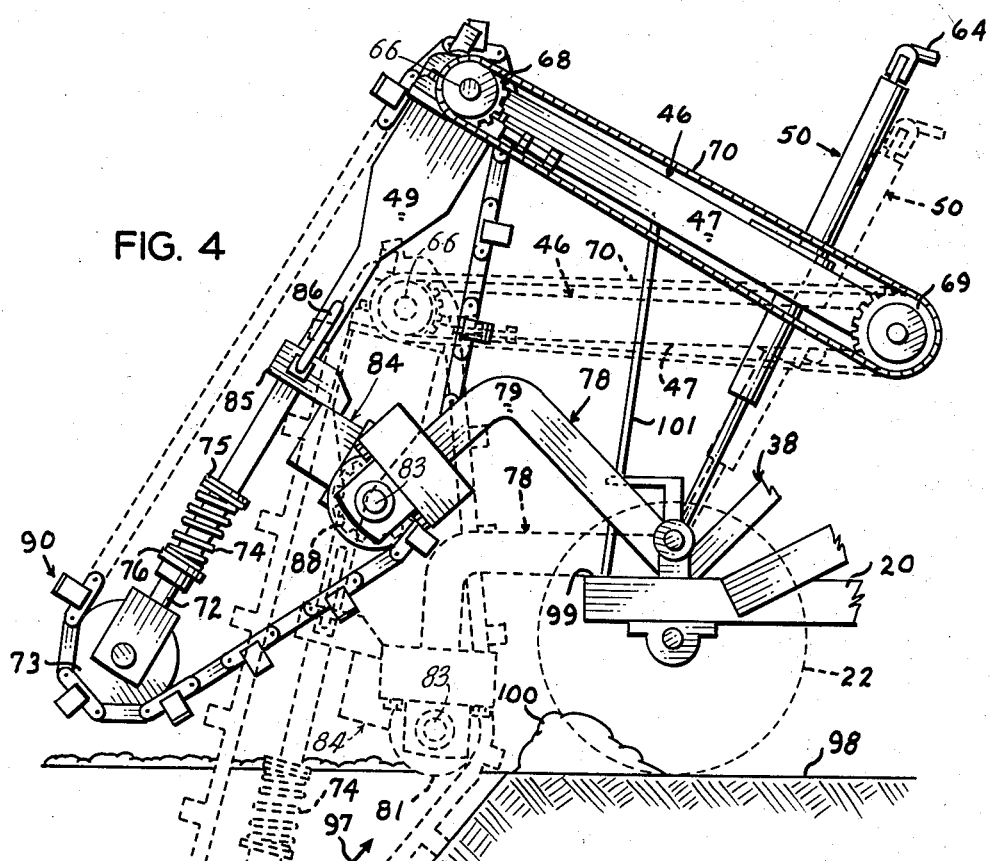
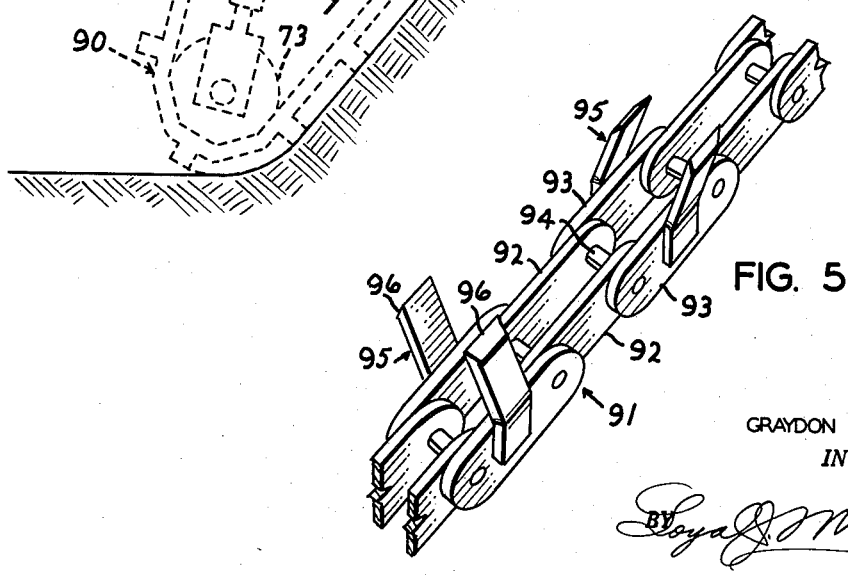
GRAYDON P. SHEEN
INVENTOR.
ATTORNEY United States Patent Office 2,888,757
Patented June 2, 1959

2,888,757
TRENCHING MACHINE
Graydon P. Sheen, Oklahoma City, Okla.
Application July 15, 1957, Serial No. 671,828
7 Claims. (Cl. 37—86)

The present invention relates to trench or ditch digging machines, and has reference more particularly to a machine for ditching lawns and the like for installing sprinkler systems.

Most of the conventional ditch digging machines currently used for excavating the earth to form a ditch for laying tubing or pipe therein when installing water sprinkling systems dig a ditch which, transversely, is of much greater width than is necessary for the installation of the piping. The principal objection to such a machine resides in the manner in which the machine tears up the turf and, when the ditch is filled with the earth removed therefrom, the loose soil must be compacted as by tamping and water soaking to permit all of the soil to be replaced and to level up the opening of the ditch. Thereafter new turf must be cultivated over the area torn up by the ditch. Replacing the turf may be accomplished by first removing the same in sections of a selected size from the area to be ditched and replacing the same on the top of the refilled ditch. This last mentioned method of operation is the most desirable of the two, from the standpoint of the home owner, but obviously this method adds considerably to the cost of installing sprinkler systems because of the additional amount of labor involved.

It is therefore the principal object of this invention to provide a ditching machine for installing sprinkler systems, and the like, which forms a trench only slightly wider than the diameter of the pipe to be used.

A similarly important object is to provide a trenching machine of this character by which a ditch may be excavated in a lawn, or the like, without first removing the turf, and which will disturb only a portion of the grass, or the like, over the area of the ditch.

I have found that earth cutting members may be connected to an endless chain and thereby drawn forwardly and upwardly through the soil to form a ditch and since, in this manner, the cutting members remove the soil dislodged from the under side of the turf upwardly, the roots and foliage of the turf are not severed the full width of the trench but tend to cling to the undisturbed portion of the turf and thereby overlap the opening formed in the surface of the earth. When the trench is refilled this over-lapping of the roots and foilage substantially covers the filled trench and more quickly resods the same.

It is therefore another important object of this invention to provide a trenching machine which includes earth cutting and removing means carried by an endless chain, or the like, which will remove dislodged soil upwardly from the under side of a turf.

Another object is to provide a trenching machine of this class which includes an engine propelled vehicle of relatively small size which will permit trenching a lawn, or the like, in relatively close quarters such as around buildings, fences, shrubs, and the like.

Another object is to provide a trenching machine of this class which includes means for conveying and depositing earth dislodged by the cutting means thereof laterally on opposing sides of the trench.

An additional object is to provide a device of this character in which the earth cutting means substantially pulverizes the earth dislodged, thereby enabling the same to be more easily replaced and compacted in the trench.

A further object is to provide a device of this class which is economical in operation and which will permit the installation of sprinkler systems, or the like, at a lower cost than is otherwise possible.

A still further object is to provide a device of this character which, because of its relatively small size and mass, permits trenching of lawns, and the like, without any material damage to the turf thereof, other than the area occupied by the trench.

The present invention accomplishes these and other objects by providing an engine propelled vehicle having a pair of rearwardly superposed booms connected at their forward ends to the rearward end portion of the vehicle for vertical swinging movement. Hydraulic lift means, carried by the vehicle, permits raising and lowering the booms simultaneously. Earth cutting means comprising an endless chain having earth digging members thereon, is entrained over the rearward end portions of the booms. Suitable transmission, clutch and drive means connects the engine with the vehicle wheels and earth cutting means for actuating the latter and for moving the vehicle in a mobile manner. Counter rotating screw conveyors having the shaft thereof journaled by the rearward end of the lowermost boom and driven by the cutting means acts to remove earth dislodged by the cutting means transversely with respect to the direction of travel of the latter.

Other objects will be apparent from the following description when taken in conjunction with the accompanying four sheets of drawings, wherein:

Figure 4 is a fragmentary side elevational view of the earth trenching mechanism and, illustrating, in dotted lines, the relative position of the same when in earth digging position;

Figure 5 is a fragmentary perspective view of the earth digging means; and,

Like characters of reference designate like parts in those figures of the drawings in which they occur.

In the drawings:

Figure 1:
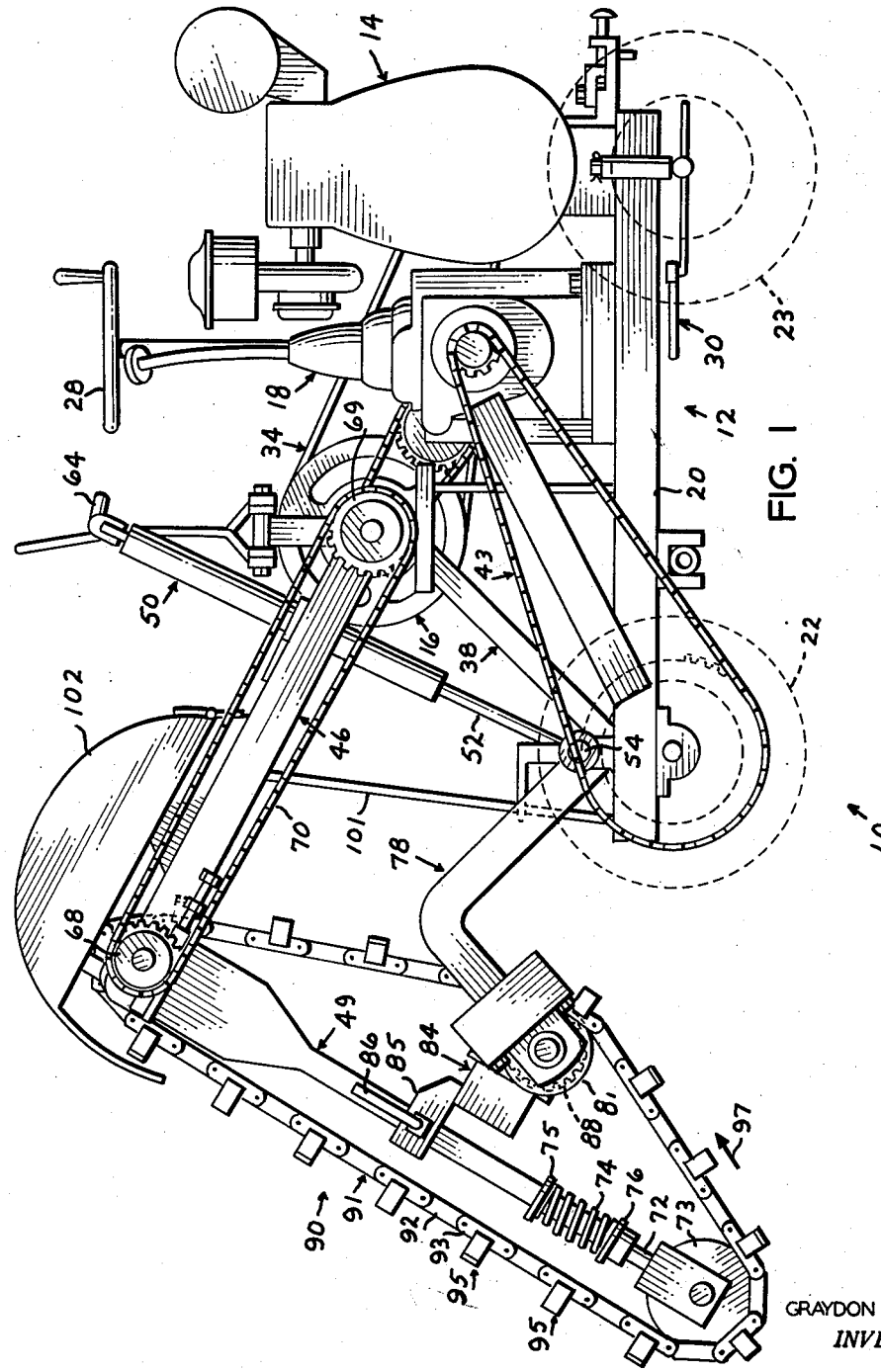
Figure 1 is a right side view of the device in roading position, the supporting wheels being shown in dotted lines for clarity.
Figure 2:
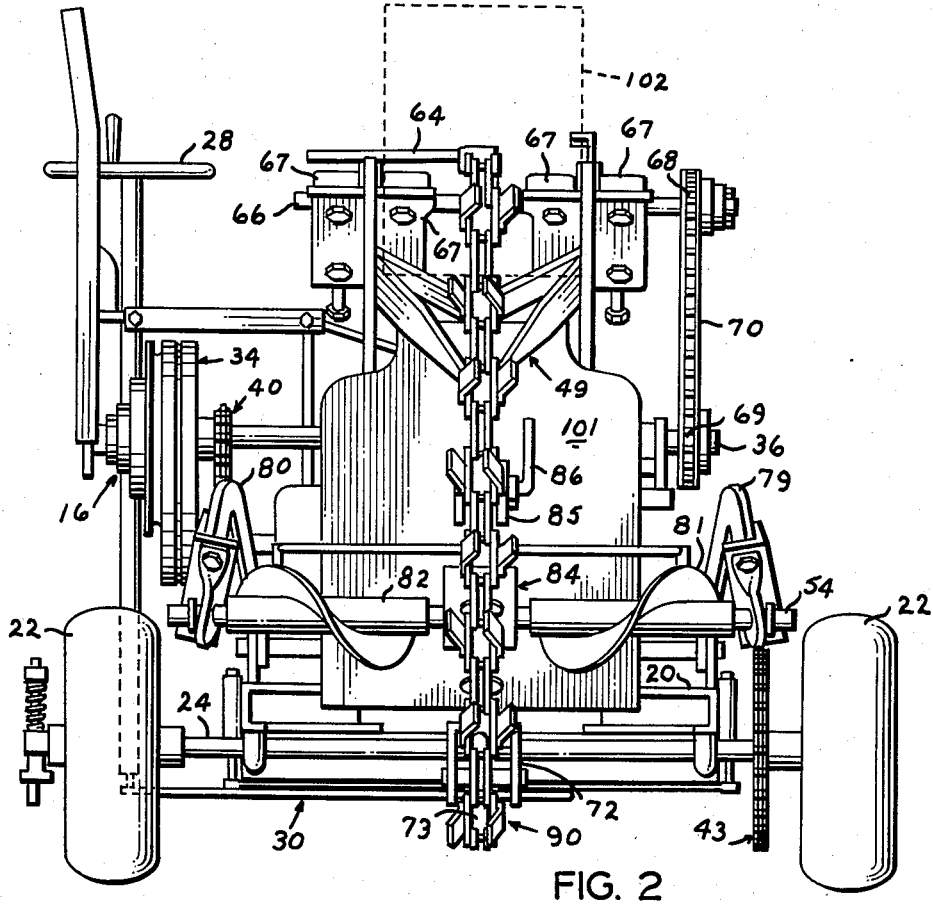
Figure 2 is a rear end elevational view of Fig. 1.

The reference numeral 10 indicates the device, as a whole, comprising a vehicle 12 supporting an engine 14 which is drivably connected to a clutch 16 and transmission 18. The vehicle 12 may be of any desired configuration and, in the example shown in the drawings, comprises a horizontally disposed base frame or body 20 supported by wheels 22 and 23 journaled by transverse axles 24 and 26. A steering wheel 28 carried by the frame 20 is operatively connected to the forward wheels 23 by linkage 30 in a conventional manner for guiding the vehicle 12.

The engine 14 is preferably disposed toward the forward end portion of the frame 20 and has the drive shaft 32 thereof drivably connected to the clutch 16 by means of belts and pulleys 34. The clutch 16 is axially supported rearwardly of the engine on a horizontal shaft 36 transversely journaled in spaced relation above the frame 20 by a suitable support 38 carried by the frame 20. Chain and sprocket means 40 drivably connects the shaft 36 to the transmission and gear means 18 which is placed between the engine and shaft 36. A driven shaft 42 projects laterally outward from the transmission 18 and is drivably connected to one of the rear wheels 22 by chain and sprocket means 43 for propelling the vehicle. A gear shift lever 44, forming a part of the conventional transmission 18, permits the vehicle to be moved by the driving power of the engine when desired.

An upper boom 46 is pivotally connected at its forward end around the shaft 36 and projects rearwardly of the vehicle. The boom 46 comprises a pair of side members 47 and 48 arranged in parallel spaced-apart relation, and which extend rearwardly of the vehicle a selected distance. The rearward ends of the side members 47 and 48 are rigidly connected to an extension 49 of the boom which projects downwardly toward the surface of the earth in substantially right angular relation with respect to the side members. Conventional hydraulic lift means, such as a hydraulic jack 50, has the free end of its plunger or piston 52 pivotally connected to a shaft 54 transversely carried by the upper surface of the rear end portion of the frame 20. The body or barrel 56 of the jack is connected to the side members 47 and 48 by clamp and bolt means 58 secured to a cross member 60 extending between the side members. The lift means 50 is operated by its handle 64 for extending or retracting the piston 52 in a conventional manner, and thus raising or lowering the boom 46, for the purposes which will presently be apparent.

A shaft 66 is transversely journaled by suitable bearings 67 carried by the rearward ends of the side members 47 and 48 and extends laterally outward beyond the side member 47 for receiving a sprocket 68 which is co-operatively aligned with a sprocket 69 carried by the shaft 36. Chain means 70, entrained over the sprockets 68 and 69, rotate the shaft 66, for the reasons which will presently be apparent. A sprocket wheel 71 is axially carried by the shaft 66 between the side members 47 and 48.

The depending end of the boom extension 49 telescopically receives one end of a shaft 72 having a bifurcated depending end which journals a disk wheel 73 in co-operative alignment with the sprocket wheel 71. An expansion spring 74 is interposed between annular shoulders 75 and 76 carried by the extension 49 and the shaft 72, respectively, for normally urging the disk 73 downwardly, for the reasons which will presently be apparent.

Figure 3:
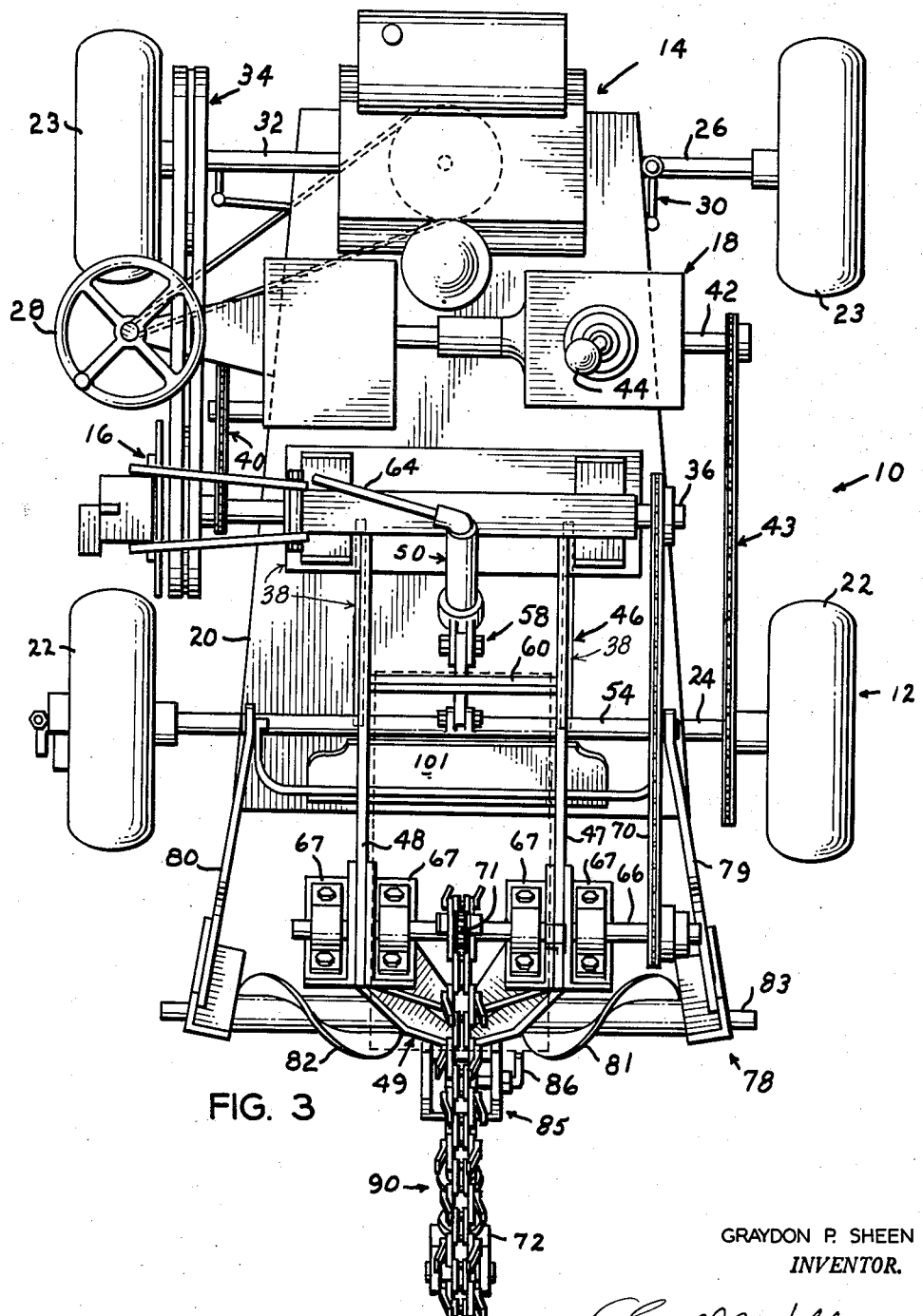
Figure 3 is a top plan view of Fig. 1.

A lower boom 78 comprises a pair of rearwardly and downwardly projecting members 79 and 80 which are pivotally connected at their forward ends to the shaft 54 in spaced-apart rearwardly diverging relation. As seen in Fig. 3, the lower boom members 79 and 80 are laterally off-set with relation to the side members 47 and 48 of the upper boom 46. The lower boom members 79 and 80 each have a downwardly projecting rear end portion which is substantially equal in length to the distance between the upper surface of the frame 20 and the surface of the earth, for the purposes which will presently be apparent. Right and left screw conveyors 81 and 82 are axially connected to a shaft 83 journaled rearward at its opposing ends by the lower ends of the lower boom members 79 and 80. Bracket means 84, having a bifurcated portion which is journaled by the shaft 83, extends rearwardly therefrom and is rigidly connected to clamp means 85 which is slidingly received loosely by the upper boom extension 49 for adjustably positioning the lower boom 78 with respect to the upper boom 46. The clamp means 85 includes a bolt having an elongated handle 86 for ease in manually releasing or tightening the clamp when raising or lowering the same with respect to the boom extension 49. A conveyor driving sprocket wheel 88 is axially carried centrally by the shaft 83 between the bifurcated end of the bracket 84 in co-operative alignment with the sprocket 71 and disk 73, for the purposes more fully explained hereinbelow.

Earth cutting means 90, including an endless chain 91, is entrained over the sprocket 71, disk 73 and conveyor driving sprocket wheel 88. The chain 91 of the earth cutting means 90, shown more clearly in Fig. 5, includes inner links 92 and outer links 93 connected by transverse pins 94 in a conventional manner. Earth cutting members 95 are connected in perpendicular relation to the outer surface of each outer link 93. The cutting members 95 are substantially rectangular in general configuration and are transversely arranged in pairs to extend outwardly from the links 93 and terminate in beveled sharpened ends 96. The forwardly and rearwardly disposed edges of each respective cutting member 95 are similarly beveled to form earth cutting edges. Each pair of cutting members 95 are alternately bent or turned laterally of the plane of the outer surface of the respective outer link 93 to form staggered pairs of cutting members projecting outwardly of the plane of travel of the chain 91. Thus, when the chain 91 is rotated and the cutting members 95 are engaged with the earth, they excavate a trench which is substantially of greater width than the transverse width of the chain.

*Operation*

In operation the engine 14 is started and the clutch 16 is engaged, which permits the engine to drive the shaft 36 by the belt and pulleys 34. This drives the chain 70 which in turn rotates the shaft 66, driving the sprocket 71 and driving the cutting means 90 in the direction as shown by the arrow 97. The hydraulic lift 50 is manually actuated to lower the booms 46 and 78 so the cutting means engages the earth, indicated by the line 98, until the booms assume the position shown by dotted lines in Fig. 4, and thus positions the conveyors 81 and 82 adjacent the surface of the earth. Downward movement of the booms 46 and 78 is limited by the side members 79 and 80 of the lower boom, contacting the upper surface 99 of the frame 20. The distance that the upper boom extension 49 projects downwardly below the lower end of the boom 78 for excavating deeper or shallower trenches is governed by the adjustment or relative positioning of the clamp 85 on the extension 49. Thus, when it is desired to cut a deeper trench, the clamp 85 is raised and repositioned toward the upper end of the extension 49. Since the spacing between the sprocket 88 and extension 49 is fixed by the rigid connection between the clamp 85 and the bracket 84, moving the clamp upward on extension 49 reduces the spacing between the booms 78 and 46. Downward movement of boom 46, and earth penetration by the disk 73, is limited by the contact of boom 78 with the base surface 99. Therefore reducing the spacing between the booms 46 and 78 results in deeper earth penetration by the disk 73. Conversely, when a shallower trench is desired, the clamp is positioned toward the lower end of the extension 49 thus increasing the spacing between the booms 46 and 78 and reducing the earth penetration of the disk 73. When such adjustments are made the expansion spring 74 maintains the proper tension on the chain 91 of the cutting means by the telescoping action of the shaft 72 within the lower end portion of the extension 49. When the cutting means 90 and booms 46 and 78 are in the position shown by the dotted lines of Fig. 4, the device is ready for forward movement to form the desired trench. The gear shift lever 44 is manually moved to engage the transmission 18 and permit the engine to drive the chain 43 for driving the wheels 22. The device is then manually guided or steered by the steering wheel 28. The cutting means 90 is rotated relatively fast and the cutting members 95 and chain lift the earth dislodged upwardly and forwardly and deposit the same forwardly of the direction of travel of the cutting means, as is shown by the irregular line 100 (Fig. 4). The chain 91 of the cutting means drives the conveyor sprocket 88, thus driving and revolving the right and left conveyors 81 and 82 in a counter rotating action. The conveyors 81 and 82 contact and convey the dislodged earth 100 laterally of the excavated trench on opposing sides thereof as the device moves forward. A plate metal shield 101 is carried by the frame 20 between the side members 79 and 80 of the lower boom, and extends upwardly toward and between the side members 47 and 48 of the upper boom 46 for retaining rearwardly of the vehicle the soil dislodged by the cutting means 90. Similarly, a soil and safety guard 102 is carried by the upper boom 46 for covering the upper end of the cutting means 90. When the desired length of trench has been excavated, the clutch 16 is disengaged and the booms are raised by the hydraulic lift 50 so that the lowermost end of the cutting means 90 clears the surface of the earth 98 for moving the device to the next desired trenching location.

I have found that when the cutting members 95 are arranged in pairs, as shown in the drawings, they are efficient for cutting trenches in relatively dry soil, but when the soil is damp it tends to ball-up between and forwardly of each pair of cutting members. Therefore, in damp or wet soils, I remove alternate ones of the pairs of cutters 95 so that the remaining cutters are connected in alternate or staggered relation on opposite sides of the chain. The chain bears against the soil loosened by the cutters 95 and the cross links 94 aid in dragging the loosened soil upwardly along the inclined forward end of the trench to the surface of the earth. When the forward edges of the cutters become dull, the chain 91 may be reversed to use the rearward edges for cutting, thus doubling the life of the cutters 95.

Figure 6:
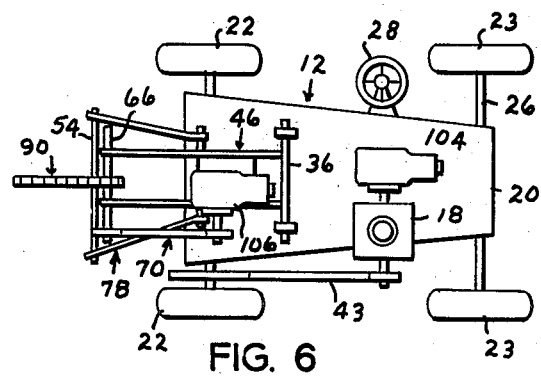
Figure 6 is a top plan view illustrating an alternate arrangement of component parts of the device.

An alternate embodiment of the device is shown in Fig. 6, which comprises the same vehicle 12, but is equipped with an electric motor 104 drivably connected through the transmission 18 for driving the wheels 22 by the chain drive 43. A second electric motor 106 is mounted upon the upper boom 46 and is drivably connected to the chain 70 for actuating the earth cutting means 90.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A trenching machine, comprising: an engine propelled vehicle; rearwardly projecting angular booms pivotally connected at their forward ends to the vehicle for vertically swinging movement; a hydraulic lift for raising or lowering said booms; earth cutting means mounted on the rearward end portions of said booms to travel an endless course and adapted to deposit earth dislodged forwardly of the rearward ends of said booms; and counter rotating conveyors having the shaft thereof journaled by the rearward end of one of said booms and adapted to contact the surface of the earth and convey earth deposited by said cutting means transversely with respect to the travel of said cutting means.

2. A trenching machine, comprising: an engine propelled vehicle; rearwardly projecting angular superposed booms pivotally connected at their forward ends to the vehicle for swinging vertically; a hydraulic lift for raising or lowering said booms; earth cutting means mounted on the rearward end portions of said booms to travel an endless course and adapted to deposit earth dislodged forwardly of the rearward end of the lowermost said boom; and counter rotating screw conveyors having the shaft thereof journaled by the rearward end of the lowermost said boom and adapted to contact the surface of the earth and convey earth deposited by said cutting means transversely with respect to the travel of said cutting means.

3. A trenching machine, comprising: an engine propelled vehicle; rearwardly projecting superposed angular booms pivotally connected at their forward ends to the vehicle for swinging vertically; a hydraulic lift for raising or lowering said booms; earth cutting means mounted on the rearward end portions of said booms to travel an endless course and adapted to deposit earth dislodged forwardly of the rearward end of the lowermost said boom; drive means connecting the engine to said cutting means for actuating the latter; and counter rotating screw conveyors having the shaft thereof journaled by the rearward end of the lowermost said boom and adapted to contact the surface of the earth and to convey earth deposited thereon by said cutting means transversely with respect to the direction of travel of said cutting means.

4. A trenching machine, comprising: an engine propelled vehicle; a rearwardly projecting lower boom pivotally connected at its forward end to the rearward end portion of said vehicle for swinging vertically, said lower boom having a downwardly disposed rear end portion; a rearwardly projecting upper boom pivotally connected at its forward end to said vehicle in spaced superposed relation above said lower boom, said upper boom having a depending rear end portion projecting downward rearwardly of said lower boom, said upper boom adjustably connected intermediate the ends of the depending portion to the rearward end of said lower boom; hydraulic lift means connected to said upper boom for raising or lowering said upper and said lower booms simultaneously; earth cutting means mounted on the rearward end portions of said booms to travel an endless course and adapted to deposit earth dislodged forwardly of the rearward end of the lower said boom; drive means connecting the engine to said cutting means for actuating the latter; and counter rotating screw conveyors having the shaft thereof journaled by the rearward end of the said lower boom and adapted to contact the surface of the earth and convey earth deposited thereon transversely with respect to the travel of the earth cutting means.

5. A trenching machine, comprising: an engine propelled vehicle; a rearwardly projecting lower boom pivotally connected at its forward end to the rearward end portion of said vehicle for swinging vertically, said lower boom having a downwardly disposed rear end portion ending in close spaced relation with a horizontal plane defining the surface of the earth when the boom is at the lowermost limit of its travel; an axle horizontally journaled by the rearward end of said lower boom; a sprocket carried by said axle; a rearwardly projecting upper boom pivotally connected at its forward end to said vehicle in superposed relation above said lower boom, said upper boom having a depending rear end portion projecting downward rearwardly of said lower boom, said upper boom adjustably connected intermediate the ends of its depending portion to the rearward end of said lower boom; hydraulic lift means carried by the vehicle and connected to said upper boom for raising and lowering said upper and said lower booms simultaneously; earth cutting means entrained over the ends of the depending portion of said upper boom and said sprocket to travel an endless course and adapted to deposit earth dislodged forwardly of said horizontal axle; drive means connecting the engine to said cutting means for actuating the latter; and counter rotating screw conveyors axially carried by said horizontal axle on opposing sides of said sprocket, said conveyors adapted to contact the surface of the earth and move earth deposited thereon transversely with respect to the direction of travel of the cutting means.

6. Structure as specified in claim 5, in which the cutting means includes, an endless link chain entrained over said sprocket and the ends of the depending portion of said upper boom, said link chain having pairs of inner and outer links; and an earth digging member rigidly connected perpendicularly to the outermost side surface of each of said outer links.

7. Structure as specified in claim 6, in which said digging members are arranged in pairs and have their free ends laterally off-set in alternate staggered relation with respect to the plane of said endless chain.

References Cited in the file of this patent

UNITED STATES PATENTS

| | | |
|---|---|---|
| 2,519,077 | Schmidt | Aug. 15, 1950 |
| 2,751,698 | Brown | June 26, 1956 |
| 2,790,255 | Riley et al. | Apr. 30, 1957 |